United States Patent [19]

Rabe et al.

[11] Patent Number: 4,998,289
[45] Date of Patent: Mar. 5, 1991

[54] SIGNAL INTEGRITY CONTROL TECHNIQUE FOR AN RF COMMUNICATION SYSTEM

[75] Inventors: Duane C. Rabe, Rolling Meadows; James E. Mitzlaff, Arlington Heights, both of Ill.

[73] Assignee: Motorola Inc., Schaumburg, Ill.

[21] Appl. No.: 203,363

[22] Filed: Jun. 2, 1988

[51] Int. Cl.$^5$ .............................................. H04B 1/10
[52] U.S. Cl. ........................................ 455/33; 455/296
[58] Field of Search .................... 455/33, 54, 56, 67, 455/226, 295, 214, 336, 207; 379/59; 328/150

[56] References Cited

U.S. PATENT DOCUMENTS

| | | | |
|---|---|---|---|
| 4,085,370 | 4/1978 | van der Poel et al. | 325/348 |
| 4,268,722 | 5/1981 | Little et al. | 179/2 EB |
| 4,531,235 | 7/1985 | Brusen | 455/33 |
| 4,561,114 | 12/1985 | Kozono et al. | 455/226 |
| 4,564,821 | 1/1986 | Reichart | 328/150 |
| 4,633,463 | 12/1986 | Mack | 455/33 |
| 4,648,126 | 3/1987 | Toffolo | 455/212 |
| 4,654,867 | 3/1987 | Labedz et al. | 379/59 |
| 4,726,073 | 2/1988 | Sessink | 455/205 |
| 4,748,625 | 5/1988 | Krause et al. | 371/22 |
| 4,882,768 | 11/1989 | Obana et al. | 455/207 |

OTHER PUBLICATIONS

"Co-Channel Interference Measurement Method for Mobile Communication", by Shigeru Kozono, IEEE Transactions on Vehicular Tech., vol. VT-36, No. 1, 2-87.
"Signal Integrity Control Technique for an RF Communication System", assigned to the assigned filed on the same day of this application.
Application IC Handbook Plessey Semiconductor, May 1982, pp. 31-39 Reference No. PSI1828.
"Operational Amplifier Characteristics & Applications", Robert G. Irvine, Prentice Hall, 1981, pp. 175 and 197.
"Statistical Properties of a Sine Wave Plus Random Noise", by S. O. Rice, Bell System Technical Journal, vol. 27, Jan. 1948, pp. 109-157.

Primary Examiner—Reinhard J. Eisenzopf
Assistant Examiner—Edward Urban
Attorney, Agent, or Firm—F. John Motsinger

[57] ABSTRACT

An interference detecting circuit is used in a cellular radiotelephone communication system which employs angular modulated frequencies in order to determine when to change the communication process so as to maintain the integrity of the communication path. For example, when the circuit detects an excessive amount of multipath or co-channel interference on a channel serving an active call, the system may decrease the effective data bit rate. The circuit includes a logarithmic envelope detector for receiving a channel's angular modulated signal and for providing a log envelope output signal, a high pass filter for removing a particular range of undesired frequencies from the log envelope output signal, and a level detector for indicating the level of filtered output signal. The output of the level detector represents the amount of interference on the angular modulated frequency signal. A microcomputer analyzes the amount of interference to determine when such communication process changes are desired.

9 Claims, 4 Drawing Sheets

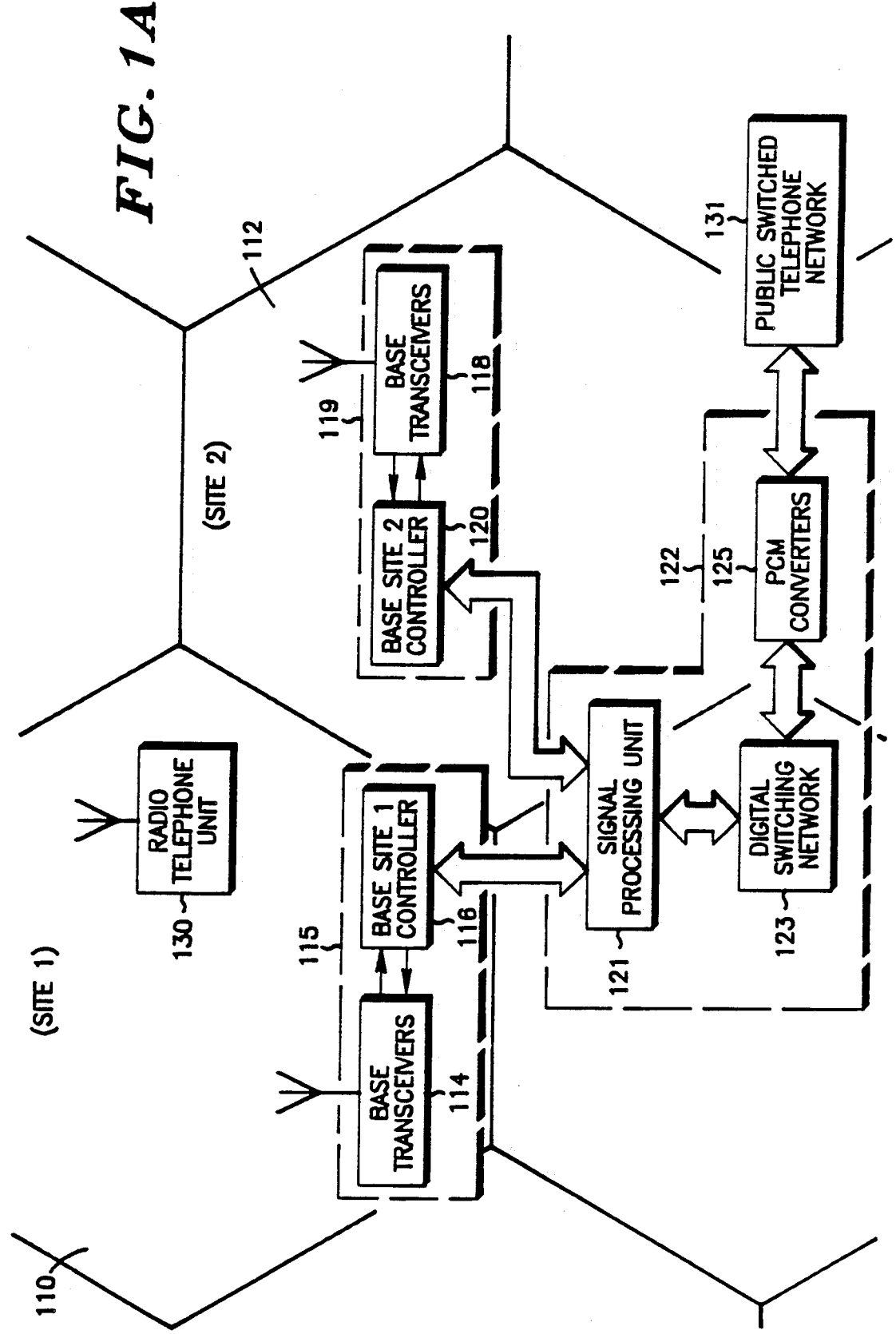

SIGNAL INTEGRITY CONTROL TECHNIQUE FOR AN RF COMMUNICATION SYSTEM

FIELD OF THE INVENTION

The present invention relates to radio frequency (RF) communication systems, and, more particularly, to controlling the signal quality of communication paths in such systems.

DESCRIPTION OF THE PRIOR ART

In RF communication systems employing angle modulation, i.e., frequency modulation (FM) or phase modulation (PM) for transmission of data, communication is often impaired as a result of co-channel interference and/or multipath interference. Co-channel interference is caused by spurious transmissions of signals on channels adjacent to the communication channel of concern. Multipath interference typically results when a signal is deflected off many structures, creating multiple reception paths, and is received as a number of multiple signals, each offset in time. Both types of interference inhibit the quality of communication to the extent that the communication channel can become no longer useful.

In order to avoid such channel degradation, communication systems have practiced error coding techniques that involve monitoring the bit error rate (BER) of the received signal, and, in response to the BER exceeding a threshold, changing the communication process to improve the integrity of the communication. For example, this is sometimes accomplished by decreasing the effective bit rate. Decreasing the effective bit rate is possible either by increasing the error coding in the signal, or by directly decreasing the transmission bit rate. Of course, there are a variety of other techniques for improving the integrity of the communication.

In any case, overcoming co-channel and/or multipath interference in this manner, requires that the interference be accurately detected, and that the system knows the extent to which the cochannel and multipath interference are contributing factors. Known techniques for such detection have not always been acceptable.

For example, a technique for detecting the extent to which the co-channel interference is contributing to the signal degradation is described in U.S. Pat. No. 4,561,114, Kozono et al. ('114), where it is proposed that co-channel interference can be detected in a narrow band communication system by looking for a high frequency beat signal produced by an interferring co-channel signal. The interference is detected based on the frequency content of the envelope of the received signal to distinguish between shadow fading (discussed later in more detail) and co-channel interference. This is accomplished through a digital analysis technique which samples a first set of signals on a relatively infrequent basis, and samples an overlapping second set of signals on a relatively frequent basis. The extraction of a substantial number of samples from the first set of signals allows the system to average out interference due to fading, while the extraction of the second set of signals allows the system to obtain the average level of the high frequency beat signal. The average level of the high frequency beat signal indicates the amount of interference caused by co-channel interference.

Unfortunately, the system described in '114 exhibits the disadvantages enumerated below. The circuitry required for digitally analyzing the samples is complex, burdensome and expensive and its response time is dependent upon the number of samples required from the first set of samples in order to average out interference due to fading. Additionally, the speed of the required digital processing circuitry limits the band-width; therefore, the speed limits the bit rate at which data can be communicated.

Overcoming multipath interference is accomplished in most communication systems by implementing the principle discussed above, i.e., transmitting data at relatively low bit rates. Unfortunately, low bit rate communication is cumbersome and becoming more and more unacceptable as system designers attempt to meet the demands for high capacity communication systems which can efficiently accommodate voice as well as data communication.

Accordingly, a communication interference detection technique is needed which overcomes the foregoing deficiencies.

OBJECTS OF THE INVENTION

It is a general object of the present invention to provide an interference detection and error correction coding system which overcomes the above-mentioned shortcomings.

It is a more particular object of the present invention to provide an interference detection system which can be used in a cellular radiotelephone communication system to determine when a change in the level of error coding is required.

It is another object of the present invention to provide an interference detection system which can be used to implement a change in the level of error coding to overcome multipath or co-channel interference in such communication paths.

BRIEF DESCRIPTION OF THE DRAWINGS

The features of the present invention which are believed to be novel are set forth with particularity in the appended claims. The invention, together with further objects and advantages thereof, may best be understood by making reference to the following description taken together with the accompanying drawings, in which reference numerals identify the elements, FIG. 1a is a diagram of a cellular communication system including two base sites and their respective equipment, according to the present invention;

DETAILED DESCRIPTION OF THE PREFERRED EMBODIMENT

The arrangement disclosed in this specification has particular use for detecting interference on a radio frequency (RF) communication channel in a cellular radiotelephone communication system. More particularly, the arrangement disclosed herein is directed to employing the detection of such interference in order to implement a level of error correction coding between radiotelephones and base site equipment in a cellular radiotelephone communication system.

Figure 1B:
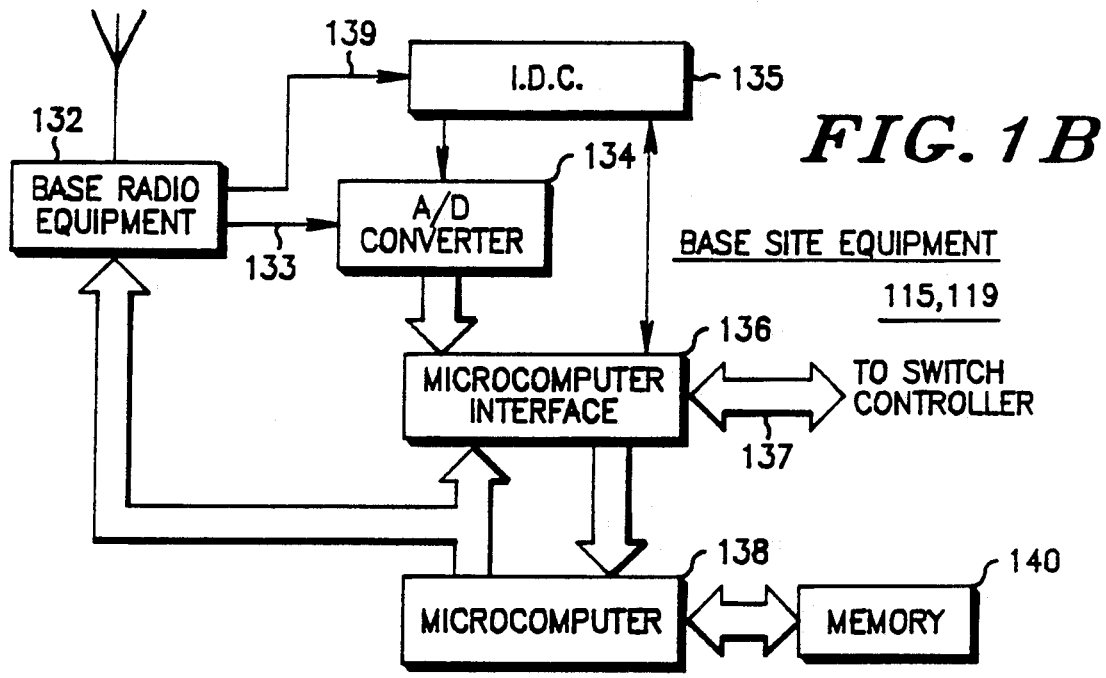
FIG. 1b is an expanded diagram of portions of the radio equipment 115, 119 or 130 of FIG. 1a that includes an interference detector circuit 135, according to the present invention.
Figure 1C:
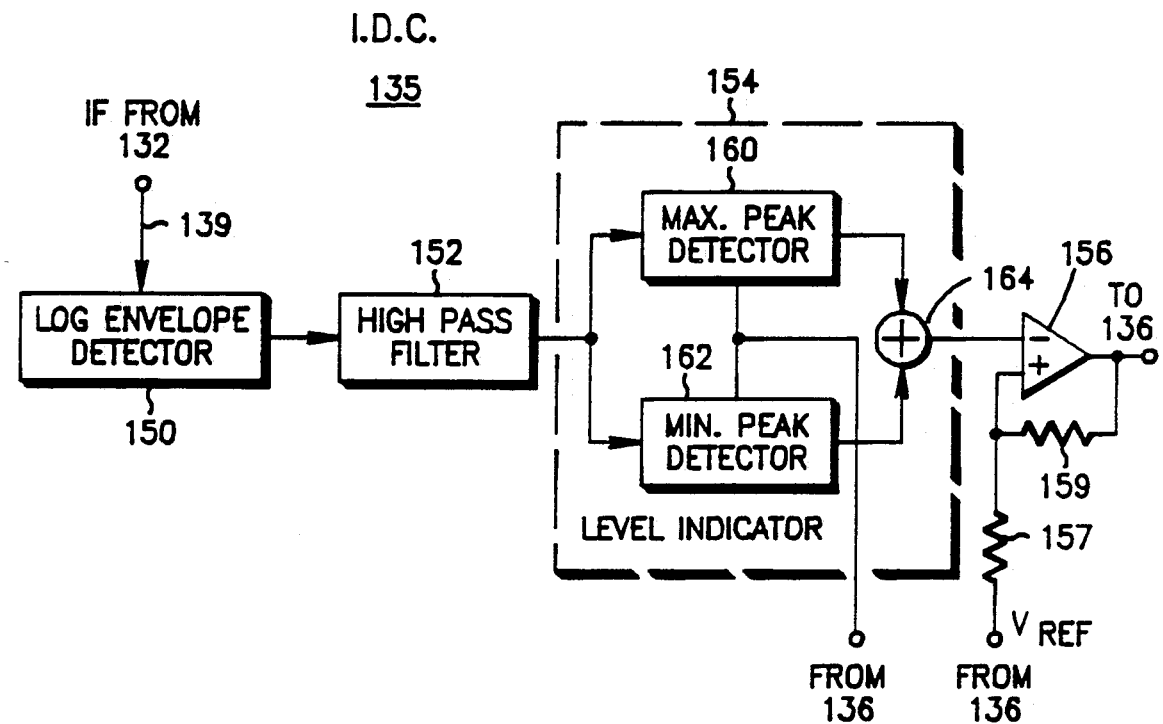
FIG. 1c diagram of the interference detector circuit 135 illustrated in FIG. 1b., according to the invention.

FIGS. 1a, 1b and 1c respectively illustrate a cellular system, base site equipment used in the system and interference detection circuitry used in the base site equipment, according to the present invention. The interference detection circuitry provides a basis on which the need for changing error correction coding is present.

The system in FIG. 1a includes base site equipment 115 and 119 for two geographic radio frequency (RF) coverage areas (cells) 110 and 112, respectively. For cell 110, the base site equipment 115 includes a set of base transceivers 114 and a base site (1) controller 116. For cell 112, the base site equipment 119 includes a set of base transceivers 118 and a base site (2) controller 120 with substantially identical circuitry as the base site equipment 115.

For purposes of exemplifying RF communication, a radiotelephone unit 130 is depicted communicating with base site equipment 115 within the respective coverage area.

Overall control of the base site equipment 115 and 119 is provided by a signal processing unit 121 of a cellular switch controller 122. The switch controller 122 also includes a digital switching network 123 for controlling the call switching operation between a public switched telephone network (PSTN) 131 and the base site equipment 115 and 119. A set of pulse code modulation (PCM) converters 125 are included in the cellular switch controller 122 for interfacing the system to the PSTN 131. For general details of a conventional cellular system, reference may be made to "Cellular Voice and Data Radiotelephone System", Labedz et. al., U.S. Pat. No. 4,654,867. For further details of a conventional cellular switch controller, reference may be made to U.S. Pat. No. 4,268,722, Little et al. Both of the above U.S. patents are assigned to the same assignee and incorporated herein by reference.

In FIG. 1b, the receiver portion of the base site equipment 115 or 119 is shown in expanded form. It should be noted that these blocks can also represent the receiver portion of the radio telephone unit 130. Representing radio telephone unit 130, this circuitry may be used for reporting the signal quality to the system for use in changing the error correction coding. Alternatively, the radiotelephone unit 130 can determine a level of signal quality degradation and request that the system change the level of error correction coding for the respective communication.

FIG. 1b includes conventional base radio equipment 132 for communicating with radiotelephones within its associated coverage area. The voice paths between the switch controller 122 (FIG. 1) and the base radio equipment 115 or 119 are depicted as 137.

The intelligence control of the base site equipment is provided by a microcomputer 138. The microcomputer 138 is used to control the radio equipment 132 and to intercouple the base site equipment with the signal processing equipment 121 of the switch controller 122 (FIG. 1a). An analog to digital converter (ADC) circuit 134 is used for receiving output signal, via a signal path 133, from a scan receiver (not shown) within the base radio equipment 132. The output signal of the scanning receiver contains signals received from the radiotelephones, and, after being converted by the ADC circuit 134, such signals are analyzed by the microcomputer 138 to obtain signal information (including radiotelephone identification-related and signal quality information such as RSSI and SAT signals) from radiotelephone units in active calls. A microcomputer interface circuit 136 is used to interface the ADC circuit 134 and the switch controller 122 with the microcomputer 138. For further details of base site equipment, reference may be made to U.S. Pat. Nos. 4,549,311-McLaughlin, supra, and 4,485,486-Webb et al. and 4,696,027-Bonta, the latter of which are also assigned to the same assignee and incorporated herein by reference.

Additionally, an interference detection circuit (IDC) is employed in conjunction with the A/D converter 134 to provide the microcomputer 138 with supplemental signal information regarding the signal quality of radiotelephones in active calls. The signal quality information is developed from an intermediate frequency (IF) signal provided at a signal path 139 by the base radio equipment 132, and is used to inform the microcomputer 138 as to the level of co-channel interference and/or multipath interference on the channel being received by the base radio equipment.

The information being received via the A/D converter 134 is synchronized with the information being received by the IDC 135 so that the microcomputer can determine which radio call is being contaminated with the interference. It should be noted that for each scan receiver circuit receiving data on a communication channel, a corresponding IDC 135 is provided therewith to simultaneously indicate the level of interference on the communication channel.

When a threshold level of such interference is detected contaminating an active call, the switch controller is informed so that a determination involving the need for a change in the level of error correction coding. If the change is required, the base site equipment hosting the active call selects the level of error correction coding and instructs the radiotelephone to implement the selected error correction coding (discussed in more detail with FIG. 4).

The IDC 135 in FIG. 1b is arranged to take advantage of the following two facts. The first fact is well known: the frequency of amplitude fluctuations imposed on an angle modulated signal resulting from co-channel interference produces a higher frequency variation in the envelope than is produced by other types of fading such as shadow fading or Rayleigh fading. For a thorough discussion of such fading, reference may be made to "*Microwave Mobile Communications*", W.C. Jakes, Wiley & Sons, 1974, incorporated herein by reference. Hereinafter, "multipath" means signals having differential path delays exceeding a substantial fraction of the data symbol duration, e.g., where the differential path delay is more than a quarter of the data symbol duration.

The second fact results from a discovery, made pursuant to the present invention, involving the use of high data rate communication in an environment conducive to multipath interference. Essentially, for high data rate communications, multipath interference causes an envelope fluctuation of an angle modulated signal that is in the same frequency range as that caused by co-channel interference. For a thorough discussion of this discovery, reference may be made to co-pending application "Interference Detection Technique for a Cellular Communication System" Rabe et al., U.S. Pat. No. 07,201,238, filed herewith, assigned to the same assignee and incorporated herein by reference.

The IDC 135 is arranged to take advantage of another discovery made pursuant to the present invention: the logarithmic envelope detector 150 can rapidly provide a direct indication of the amount of interference on the received (IF) signal without the need for averaging the more slowly varying mean signal strength, thereby allowing a more rapid response time than circuits which require averaging of signal strength. More specifically, the logarithmic envelope detector 150 will provide an AC output signal having a magnitude that is directly related to the percentage of amplitude modulation in the envelope of the received (IF) signal regardless of the absolute magnitude of the received (IF) signal.

The amplitude modulated IF signal received by the logarithmic envelope detector 150 is expressed mathematically as:

$$S(t) = S_o(1 + A_m \sin w_m t) \sin w_c t \quad (1)$$

where:
$S_o$ is the average signal strength;
$A_m$ is the modulation level (% AM = $100 \times A_m$);
$w_m$ is the modulating frequency; and
$w_c$ is the carrier frequency (IF).

The envelope function of S(t) may be obtained by removing the $w_c t$ term from equation (1), resulting in:

$$R(t) = \text{Env }[s(t)] = S_o(1 + A_m \sin w_m t) \quad (2)$$

Taking the logarithm of both sides of equation (2) yields:

$$\text{Log } R(t) = \text{Log } S_o + \text{Log}(1 + A_m \sin w_m t). \quad (3)$$

The D.C. component of the envelope function (or the average signal strength) can be recognized from equation (3) as the term Log $S_0$, while the term Log $(1 + A_m \sin W_m t)$ can be recognized as the AC component of the envelope function having maxima and minima of Log $(1 + A_m)$ and Log $(1 - A_m)$, respectively.

The relationship between the % AM, Am, minima, maxima, Peak to Peak (P-P) AC Swing and P-P AC of equation (3) is summarized in the table below which includes computational data based on the foregoing equations, and assuming that $S_o = 1$ (if $S_o$ is larger the P-P AC Swing table entries would not be effected due to the subtraction of the minima and maxima terms).

| % AM | $A_m$ | Log R(t) |Min| | Log R(t) Max | P-P AC Swing | P-P AC (P-P AC)/$A_m$ |
|---|---|---|---|---|---|
| 2 | .02 | −.009 | .009 | .018 | .90 |
| 5 | .05 | −.022 | .021 | .043 | .86 |
| 10 | .1 | −.046 | .041 | .087 | .87 |
| 20 | .2 | −.097 | .079 | .176 | .88 |
| 50 | .5 | −.301 | .176 | .477 | .95 |
| 70 | .7 | −.523 | .203 | .753 | 1.08 |
| 80 | .8 | −.699 | .255 | .954 | 1.19 |
| 90 | .9 | −1.000 | .279 | 1.279 | 1.42 |
| 100 | 1.0 | −infinity | .301 | infinity | infinity |

The first two columns of the table indicate the actual percentage of amplitude modulation imposed onto the received (IF) signal and the corresponding fraction thereof (%/100), respectively. The third and fourth columns indicate the previously discussed minima and maxima terms from equation (3), respectively. The fifth column, representing the P-P AC Swing, is the maxima table entry for the corresponding amount of AM less the corresponding minima table entry. The last column indicates the relationship of correspondence between the P-P AC Swing measurement and the amount of AM, i.e.

[P-P Swing measurement/amount of AM].

The last column in the above table indicates that for $A_m$ between 0 to 0.8, the P-P AC Swing coincides directly with $A_m$ to within ±20% accuracy. In critical situations, the accuracy of the measured value of $A_m$ could be improved by using a look-up table to relate the measured P-P AC swing to $A_m$. In summary, this illustrates that the output of a logarithmic envelope detector can provide a direct indication of the amount of amplitude modulation on the received (IF) signal.

In sum, the foregoing discussion shows that:
co-channel and/or multipath interference causes amplitude modulation on the received (IF) signal at about the same frequency;
such interference amplitude-modulates the received (IF) signal at a higher frequency than the amplitude modulation produced by fading; and
the P-P AC Swing developed at the output of a Log envelope detector coincides with the amount of co-channel and/or multipath interference on the received (IF) signal.

In accordance with these discoveries and principles, in FIG. 1c, the IDC 135 from FIG. 1b is shown in expanded form to include a logarithmic (Log) envelope detector 150, a high pass filter (HPF) 152, a level indicator 154 and a comparator 156. Log envelope detectors are conventionally included as part of cellular radio equipment. The circuit arrangement of FIG. 1c employs the logarithmic (Log) envelope detector 150 to develop an output signal representing the Log envelope of the received (IF) signal. The (HPF) 152 receives the output signal from the detector 150 to filter out the DC term at the output of the Log envelope detector as well as the low frequency modulation produced by any fading which might be present on the received (IF) signal. The level indicator 154 receives the output of the HPF 152 to analyze the P-P AC Swing voltages, described with the above table, and to develop a corresponding signal representative of the amount of modulation therefrom. The comparator 156 employs a reference voltage ($V_{ref}$) at one of its inputs (with hysteresis via resistors 157 and 159) and the output of the level indicator 154 at the other of its inputs. The reference voltage sets a threshold level against which the output of the level indicator is compared. Since the level indicator indicates the amount of AM due to cochannel and/or multipath interference, when this threshold level is exceeded, the the microcomputer 138 (FIG. 1a) is alarmed by the output of the comparator 156.

The Log envelope detector 150 can be employed using a conventional integrated circuit such as those used for RSSI (received signal strength indicator) measurements in cellular radios. For example, an integrated circuit such as an MC3363 available from Motorola, Inc. is adequate. Generally, such circuits are described in "Applications IC Handbook", Plessey Semiconductors', PSI 1828, pp. 31–39, incorporated herein by reference.

HPF 152 can remove the DC component from the log detector output signal and any fading induced low frequency AC component by setting the cutoff frequency of the HPF 152 adequately high. This allows the microcomputer 138 to base the interference measurement soley on interference due to co-channel and/or multipath interference. Preferably, the cutoff frequency of the HPF 152 is set to the lowest modulating frequency expected on the received (IF) signal since the main component of the AC waveform from the Log detector is at the modulating frequency. In many data applications, the "lowest" modulating frequency is about 1/10th of the bit rate (assuming that some type of protocol, e.g., Manchester coding, is used to eliminate long strings of binary 1's or 0's from the data stream).

In systems employing a data communication rate which is significantly larger than the maximum doppler frequency, the HPF 152 can be implemented using a conventional R-C (resistor-capacitor) section filter. Otherwise, a conventional (multi-pole) high pass or band pass filter may be used to remove the undesired low frequency information.

The level indicator 154 in FIG. 1c includes a maximum peak detector 160 and a minimum peak detector 162 for respectively detecting the envelope function's maxima and minima, i.e., the Log $(1+A_m)$ and Log $(1-A_m)$ terms from equation 3. The latter of these two terms is effectively subtracted from the former by a conventional summing circuit 164. The output of the summing circuit 164 provides a signal representative of the P-P AC swing voltage measured on the logarithmic envelope of the received (IF) signal (representing the level of interference on the received (IF) signal).

Alternatively, the signal representative of the P-P AC swing voltage can be provided directly to an analog to digital input port for analysis by the microcomputer, or the reference voltage ($V_{ref}$) can be variably controlled by the microcomputer to allow automatic flexibility to the threshold inference level.

Figure 2:
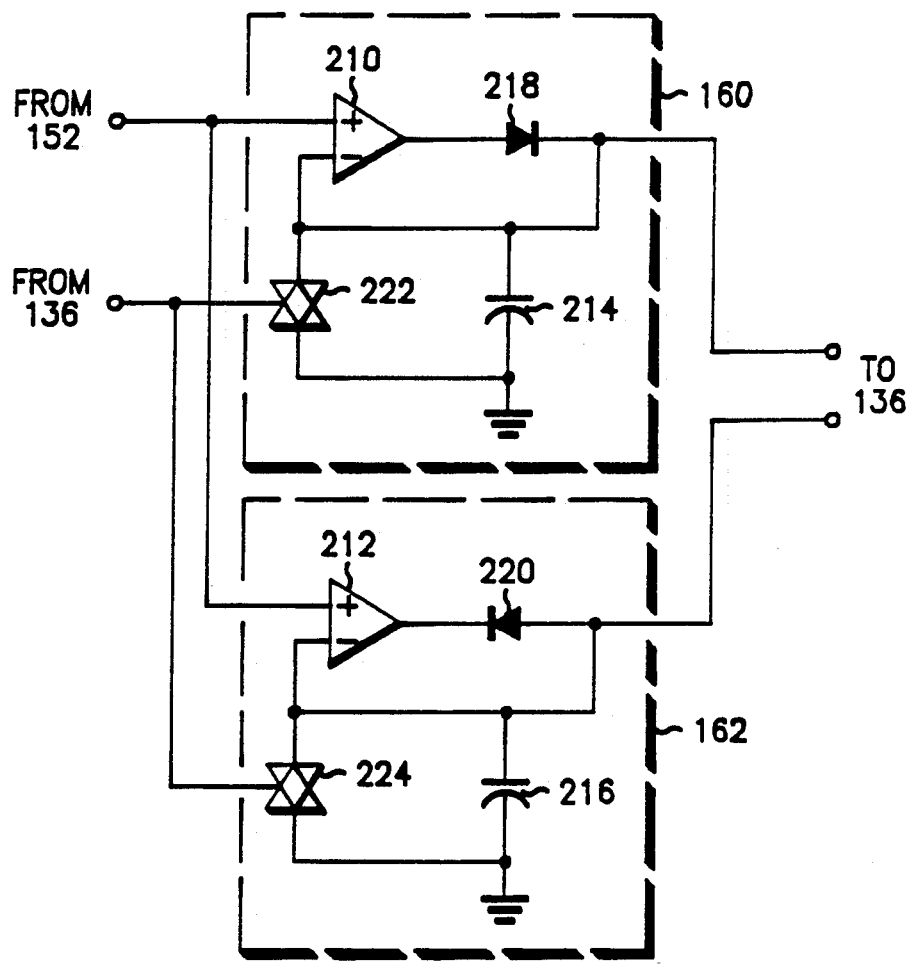
FIG. 2 is an expanded diagram of blocks 160 and 162 illustrated FIG. 1c., according to the present invention.

FIG. 2 illustrates an implementation of the peak detectors 160 and 162. Each peak detector 160 or 162 includes a differential amplifier 210 or 212 which is used to charge a capacitor 214 or 216 through a diode 214 or 216, respectively. A transmission gate 222 or 224 is employed within each detector 160 or 162 to reset the charge on the respective capacitor 214 or 216 under control of the microcomputer 138. For more details on peak detectors, reference may be made to *Operational Amplifier Characteristics & Applications*, Robert G. Irvine, Prentice Hall, 1981, page 197, incorporated herein by reference.

Figure 3:
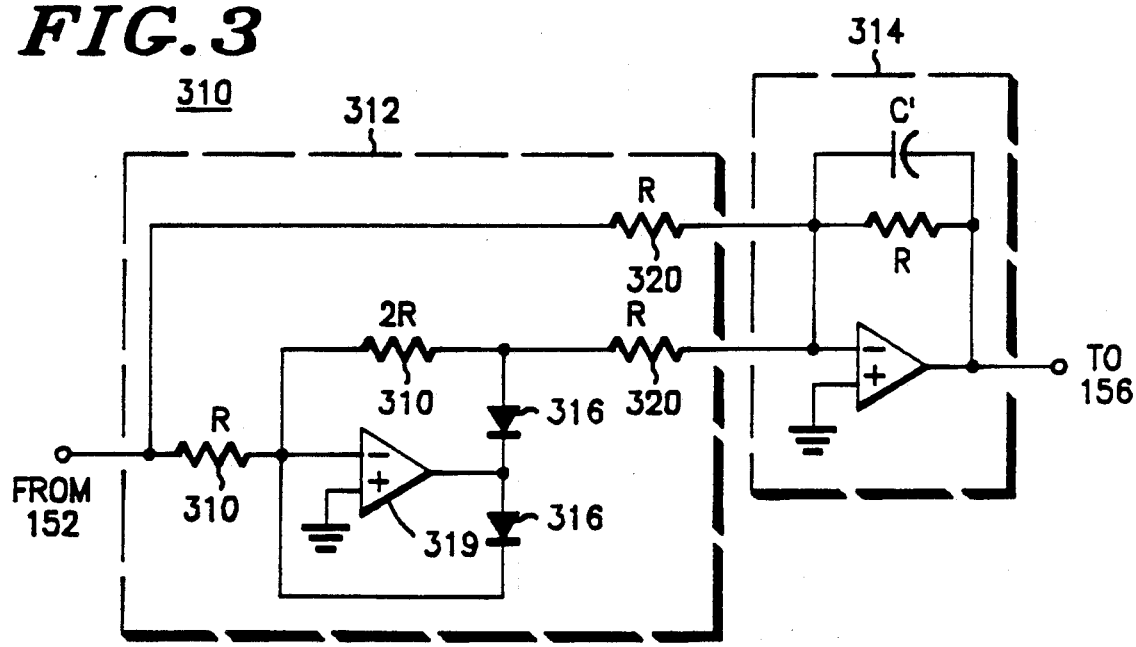
FIG. 3 is an alternate embodiment of block 154 of the interference detector circuit 135 illustrated in FIG. 1b., according to the present invention.

FIG. 3 illustrates a conventional average level indicator 310 which may be used in place of the level indicator 154 of FIG. 1c. In FIG. 3, the average level indicator 310 includes a full-wave rectifier 312 in combination with a low pass filter (C') 314. The full-wave rectifier 312 employs an operational amplifier 319, a pair of diodes 316 and resistors 318 to provide to fully rectified signal to the low pass filter 314. Two additional resistors 320 are used to add the fully rectified signal to the signal received from the HPF 152. The sum signal, provided therefrom, is received by the low pass filter 314 to provide an averaging of the rectified AC signal. For more details, reference may be made to *Operational Amplifier Characteristics & Applications*, supra at 175.

Figure 4:
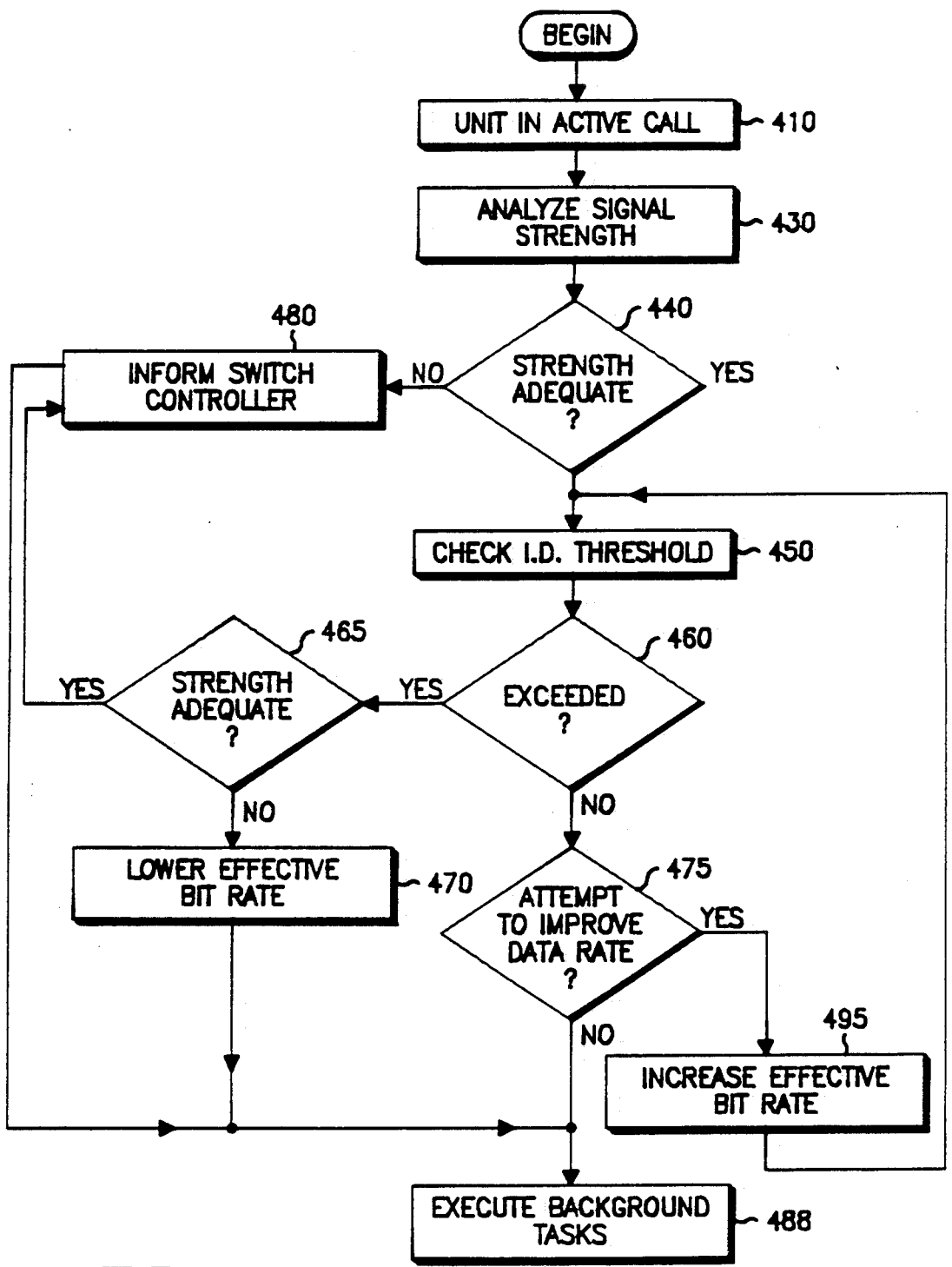
FIG. 4. is a flow chart, according to the present invention, which may be implemented by a microcomputer to effect an error correction coding implementation in a cellular system.

In FIG. 4, a flow chart, in accordance with the present invention, illustrates a manner in which the IDC 135 of FIG. 1b can be used by the microcomputer 138 of FIG. 1b to implement a change in the level of error correction coding between a radiotelephone unit 130 and the base station equipment 115 of FIG. 1b. The flow chart begins at block 410 where a radiotelephone unit is depicted in an active call with the base site equipment. From block 410, flow proceeds to block 430 where a test is performed to determine the strength of the signal being transmitted from the radiotelephone unit.

At block 440, the microcomputer performs a test to determine whether or not the signal strength is acceptable for continued communication. If the signal strength is not adequate, flow proceeds to blocks 480 and 488 where the microcomputer informs the switch controller of this condition and then proceeds to execute conventional background tasks. If the signal strength is adequate, flow proceeds from block 440 to blocks 450 and 460 where the microcomputer checks the output of the IDC to determine if the threshold level (indicating excessive co-channel and/or multipath interference) has been exceeded. Of course, the steps 410–460 would be periodically executed to maintain acceptable communication for the radiotelephone in the active call.

From block 460, flow proceeds to block 465 if the threshold level has been exceeded. At block 465, a test is performed to determine if the data rate presently employed is at the minimum level. If not, the effective bit rate is decreased one step, block 170, and flow proceeds to block 488. If the data rate presently employed is at the minimum level, flow proceeds to block 480 where the microcomputer informs the switch controller of this condition.

If the microcomputer determines that the IDC threshold has not been exceeded, flow proceeds from block 460 to block 475. At block 475, the microcomputer determines if an improvement to the effective data rate should attempted. Such a determination is conventional, and can include factors such as whether the rate is already at a maximum rate, how recent such an attempt was made or the priority of other tasks that require execution. Based on such considerations, if the microcomputer determines that an improvement to the effective data bit rate should be attempted, flow proceeds to block 495.

At block 495, the effective data bit rate is increased one step, and flow returns therefrom to block 450 to determine if the signal integrity is still acceptable. If the microcomputer determines that an improvement to the effective data bit rate should not be attempted, flow proceeds to block 495.

Preferably, the changes to the effective data bit rate involve changing the amount of error correction coding in the signal, and/or directly changing the transmission bit rate. The former approach can be accomplished by changing the communication protocol between one which requires no error coding bits and one which requires varying levels of error coding. The latter approach, directly changing the transmission bit rate, is conventionally employed in systems having a plurality of fixed data bit rates from which to select.

It will be understood by those skilled in the art that the foregoing illustrations and discussions merely exemplify preferred embodiments of the present invention and that various modifications and changes may be made to the present invention without departing from the spirit and scope of the following claims. For example, the IDC could readily be implemented using digital circuitry and digital signal processing techniques which implement similar functions as the analog counterparts described herein. Such circuitry could be implemented in a time division multiplex access (TDMA) cellular system rather than an analog cellular system as described above.

Another variation of the present invention could entail employing an alternative procedure to that illustrated in FIG. 4. For example, the procedure described in "Optimal Baud Rate Transmission System", U.S Pat. No. 4,748,625, assigned to the present assignee and incorporated herein by reference, can be adapted to similarly employ the IDC.

What is claimed is:

1. A circuit for controlling the communication efficiency in an RF data communication path between a first unit and a second unit communicating via high frequency angular modulation, comprising:
   logarithmic envelope detection means for detecting the signal integrity of the communicated data, including:
   a logarithmic envelope detector for receiving the high frequency angular modulated signal and for providing a log envelope signal,
   a filter for removing a particular range of undesired frequencies from the log envelope signal, and
   means responsive to said filtered log envelope signal, for indicating a level of correlated interference based on a detected amplitude modulation of the filtered log envelope signal; and
   means, responsive to said logarithmic envelope detection means, for improving the integrity of at least one respective RF data communication path between a radiotelephone and the associated base equipment based on the indicated level of correlated interference.

2. A circuit, according to claim 1, wherein said filtered undesired frequencies includes frequencies at and below frequencies caused by fading.

3. A circuit, according to claim 1, wherein said means for indicating includes means for detecting a maximum level and a minimum level of the filtered log envelope signal.

4. A circuit according to claim 3, wherein said means for indicating includes means for combining the detected maximum level and minimum level of the filtered log envelope signal.

5. A circuit, according to claim 4, wherein said means for indicating includes means for detecting if the combined maximum and minimum levels of the filtered log envelope signal exceeds a threshold level.

6. A circuit according to claim 3, wherein said means for indicating includes means for resetting the maximum level and the minimum, level of the filtered log envelope signal.

7. A circuit for logarithmically detecting and indicating a level of correlated interference on a high frequency angular modulated signal, according to claim 1, wherein the level of correlated interference is determined without averaging mean signal strength.

8. For use in a cellular radiotelephone communication system having a plurality of cell sites, wherein each cell site has associated base site equipment and corresponding radiotelephone communication coverage areas and each cell site employs a plurality of angular modulated frequencies which are used for radiotelephone communication, said base site equipment at each cell site comprising:
   base radio equipment for communication with the radiotelephone;
   a circuit, responsive to said base radio equipment, for logarithmically detecting and indicating a level of correlated interference on communication frequencies within said cell including:
   a logarithmic envelope detector for receiving the high frequency angular modulated signal and for providing a log envelope signal,
   a filter for removing a particular range of undesired frequencies from the log envelop signal, and
   means responsive to said filtered log envelope signal, for indicating a level of correlated interference based on the detected amplitude modulation of the filtered log envelope signal; and
   processing means for analyzing signals received from said base radio equipment and said circuit, for improving the integrity of at least one respective RF data communication path between a radiotelephone and the associated base equipment based on the indicated level of correlated interference.

9. A circuit for logarithmically detecting said indicating a level of correlated interference on a high frequency angular modulated signal, according to claim 8, wherein the level of correlated interference is determined without averaging mean signal strength.

* * * * *

UNITED STATES PATENT AND TRADEMARK OFFICE
CERTIFICATE OF CORRECTION

PATENT NO. : 4,998,289

DATED : March 5, 1991

INVENTOR(S) : Duane C. Rabe Et Al.

It is certified that error appears in the above-identified patent and that said Letters Patent is hereby corrected as shown below:

In Column 10, line 9, please delete the comma "," after "minimum".

In Column 10, line 45, please delete the word "said" and replace with --and--.

Signed and Sealed this

Eleventh Day of August, 1992

Attest:

DOUGLAS B. COMER

Attesting Officer

Acting Commissioner of Patents and Trademarks